United States Patent [19]

Maupin, Jr.

[11] Patent Number: 4,467,955
[45] Date of Patent: Aug. 28, 1984

[54] AXLE STUBBING JIG AND METHOD OF USE

[76] Inventor: Cecil L. Maupin, Jr., P.O. Box 490, Dodge City, Kans. 67801

[21] Appl. No.: 416,070

[22] Filed: Sep. 8, 1982

[51] Int. Cl.³ .............................................. B23K 31/00
[52] U.S. Cl. .................................. 228/119; 228/49 B; 269/43; 269/287
[58] Field of Search ..................... 228/6 R, 119, 49 B, 228/18; 138/97; 29/271, 272, 281.1, 281.5, 281.6; 269/43, 287

[56] References Cited

U.S. PATENT DOCUMENTS

| 2,457,273 | 12/1948 | Renfroe | 269/287 |
| 3,030,903 | 4/1962 | Morris | 269/43 |
| 3,933,292 | 1/1976 | Martin | 228/49 B |
| 3,952,936 | 4/1976 | Dearman | 269/43 |
| 4,052,045 | 10/1977 | Shaddix | 269/43 |

FOREIGN PATENT DOCUMENTS 883081 7/1953 Fed. Rep. of Germany ...... 269/287

Primary Examiner—Nicholas P. Godici
Assistant Examiner—Marc Hodak
Attorney, Agent, or Firm—Harvey B. Jacobson

[57] ABSTRACT

A support is provided for rotatable mounting on a circular brake backing plate mounting flange of an axle end spaced inward of the terminal end thereof to be cut from the axle end and replaced by an axle stub end. The support includes structure for mounting a cutting torch tip therefrom in position to cut the terminal end of the axle end therefrom along a circumferential zone spaced slightly outward of the backing plate. A cylindrical jig is also provided including structure on one end for mounting to the backing plate in concentric relation therewith and the jig includes internal structure supporting and journaling an axle stub therefrom in axial alignment with the jig and with the axle stub being adjustably positionable along its longitudinal center axis to a position with its inner end abutted against the cut end of the axle end. The jig includes circumferentially spaced windows therein through which tack welding of the axle stub end to the cut axle end may be accomplished and after the tack welding operation has been completed the jig may be removed to expose the tack welded joint between the axle end and the axle stub end for access thereto in forming a continuous weld bead thereabout.

8 Claims, 10 Drawing Figures

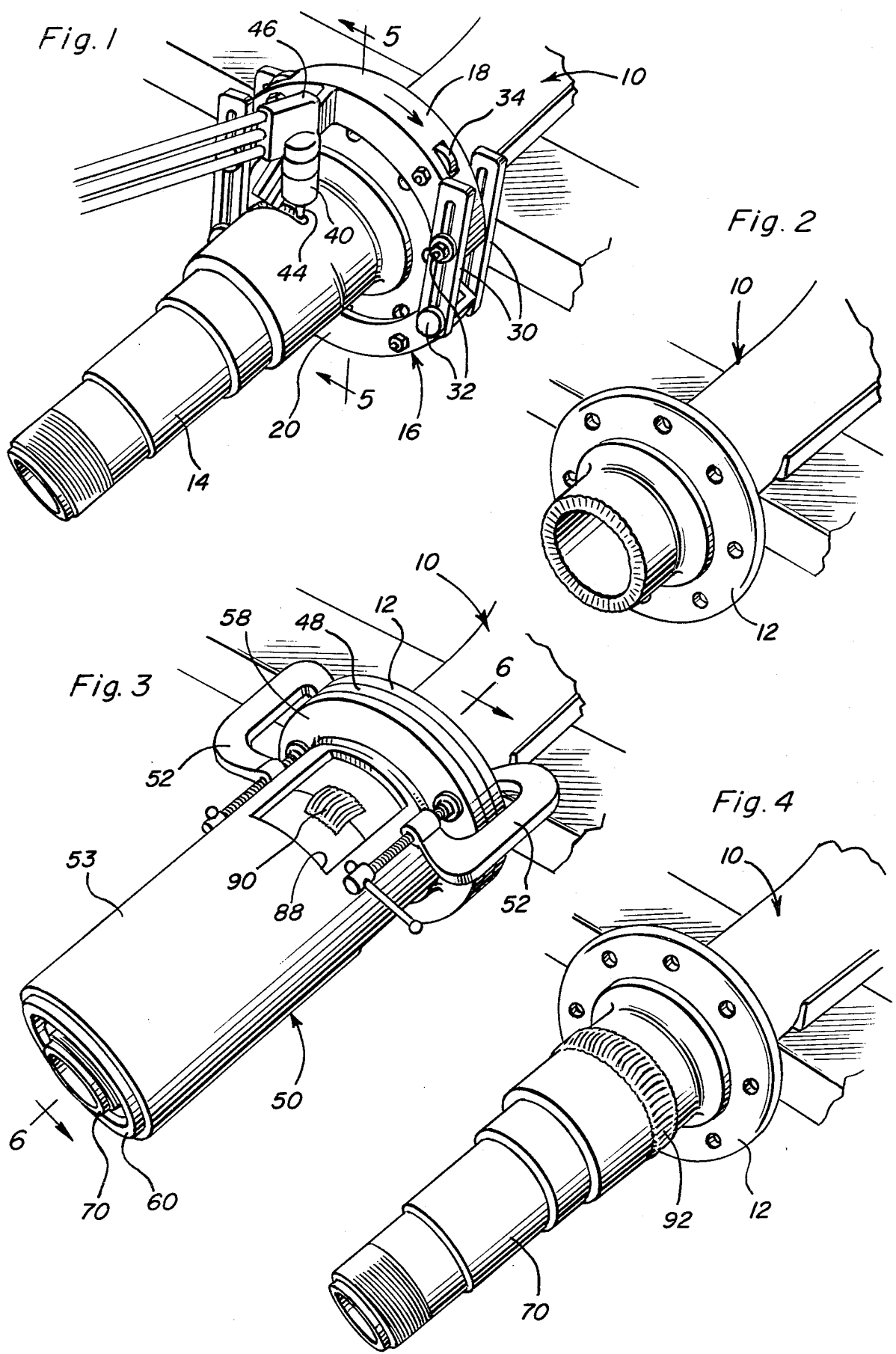

AXLE STUBBING JIG AND METHOD OF USE

BACKGROUND OF THE INVENTION

When the wheel journaling end of the axle of a vehicle such as a semi-trailer or other heavy load carrying vehicle becomes damaged beyond repair (such as occurs when wheel bearings become excessively overheated) it is necessary either to replace the axle or to renew the axle end by cutting the old damaged axle end therefrom and replacing the same with a new stub end. If the axle is to be replaced, it is of course necessary to remove the old axle and all of the attendant brake and axle suspension components therefrom and to thereafter install the new axle, all of which involves considerable expense in parts and labor. Further, in the past if a damaged axle was to have the end thereof renewed by cutting the old damaged end from the axle and the replacement of the damaged axle by new axle stub end, it was also necessary to remove the axle and transport the same to a machine shop in which the damaged end could be removed and the replacement stub end could be installed by precision equipment. Here again, this involves not only considerable expense from a labor and parts standpoint but also involves machining costs and considerable "down time" of the associated vehicle.

Accordingly, a need exists for an apparatus and method of renewing an axle end by the removal of the damaged end thereof and the mounting of a replacement stub end on the axle with a minimum of parts and labor cost and a minimum of "down time".

The instant invention involves the provision and the utilization of a jig by which a damaged axle end may be accurately cut from an axle while the latter remains on the associated vehicle and a replacement stub end may be secured to the axle, even at a roadside site with the only tools being required comprising conventional wheel and wheel brake backing plate removal tools and a cutting and welding torch.

In this manner, the cost involved in towing a disabled semi-trailer to a garage area, the labor expense involved in fully removing the damaged axle and machine shop costs may be eliminated or substantially reduced. Further, the "down time" of a semi-trailer as a result of an axle end repair accomplished through the utilization of the jig of the instant invention may be reduced from approximately 24 hours to 4 hours.

Examples of various jigs and other similar structures including some of the general structural and operational features of the instant invention are disclosed in U.S. Pat. Nos. 2,405,541, 2,680,287, 3,176,378, 3,529,339 and 3,759,258.

BRIEF DESCRIPTION OF THE INVENTION

The jig of the instant invention includes a support for rotatable mounting on a circular backing plate mounting flange of an axle end and includes structure for adjustably stationarily supporting a cutting torch therefrom whereby the terminal end of the axle may be cut therefrom. In addition, the jig includes a tubular body for support from the aforementioned backing plate subsequent to the cutting of the axle terminal end from the axle and the tubular body includes mounting structure for supporting the body in coaxial relation with the backing plate. The tubular body further includes axle stub end support structure therein for journaling a replacement axle stub and therefrom in coaxial relation therewith and for longitudinal shifting of the supported stub axle end relative to the cylindrical body. Also, the cylindrical member includes peripherally spaced windows formed therein through which tack welding operations may be performed.

The main object of this invention is to provide an apparatus and a method for inexpensively replacing the end of an axle while the axle remains mounted on the associated vehicle and without the necessity of precision tooling machinery.

Another object of this invention is to provide a jig for and a method of replacing an axle end requiring only average mechanical skill and the use of simple tools and a cutting and welding torch.

Still another object of this invention is to provide an apparatus and a method in accordance with the preceding objects wherein "down time" of the associated vehicle may be reduced to approximately one-sixth of the average "down time" encountered when an axle end is replaced by present methods.

A final object of this invention to be specifically enumerated herein is to provide an apparatus and a method in accordance with the preceding objects and requires the utilization of structure conforming to conventional forms of manufacture, being of simple construction, and easy to use so as to provide an apparatus and a method which may accomplish the desired function at a low cost and in a minimum of time.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of a vehicle axle end preparatory to removal of the axle end through utilization of a portion of the jig of the instant invention;

FIG. 2 is a perspective view of the assemblage illustrated in FIG. 1 independent of the jig and after the axle end has been removed;

FIG. 3 is a perspective view similar to FIG. 2 illustrating the manner in which a second component of the jig may be used for proper positioning of the replacement axle end relative to the axle and tack welding operations may be carried out to initially secure the axle end upon the axle;

FIG. 4 is a fragmentary perspective view of the axle after the securement of the replacement axle stub end thereto has been carried out;

DETAILED DESCRIPTION OF THE INVENTION

Referring now more specifically to the drawings the numeral 10 generally designates a heavy duty axle including a circular brake backing plate mounting flange 12 and an axle end 14 which has been rendered unserviceable and must be replaced. The axle end 14 is disposed outwardly of the mounting flange 12.

Figure 5:
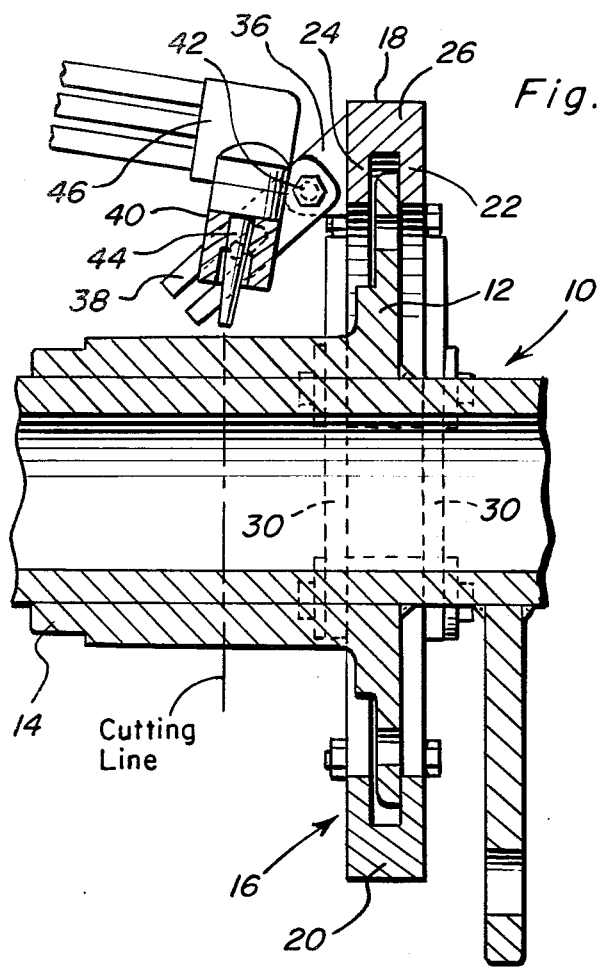
FIG. 5 is an enlarged fragmentary vertical sectional view taken substantially upon the plane indicated by the section line 5—5 of FIG. 1.
Figure 7:
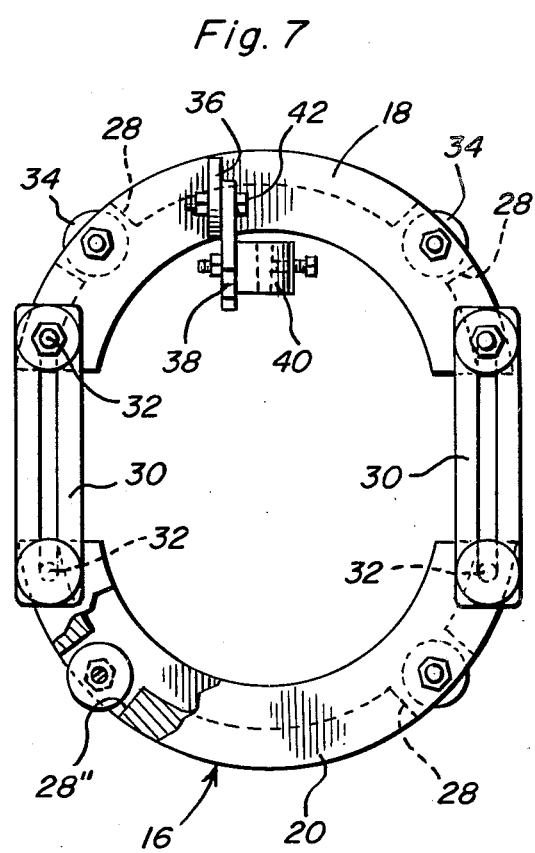
FIG. 7 is an elevational view of the jig component illustrated in FIG. 1 and with portions thereof being broken away and illustrated in vertical section.
Figure 8:
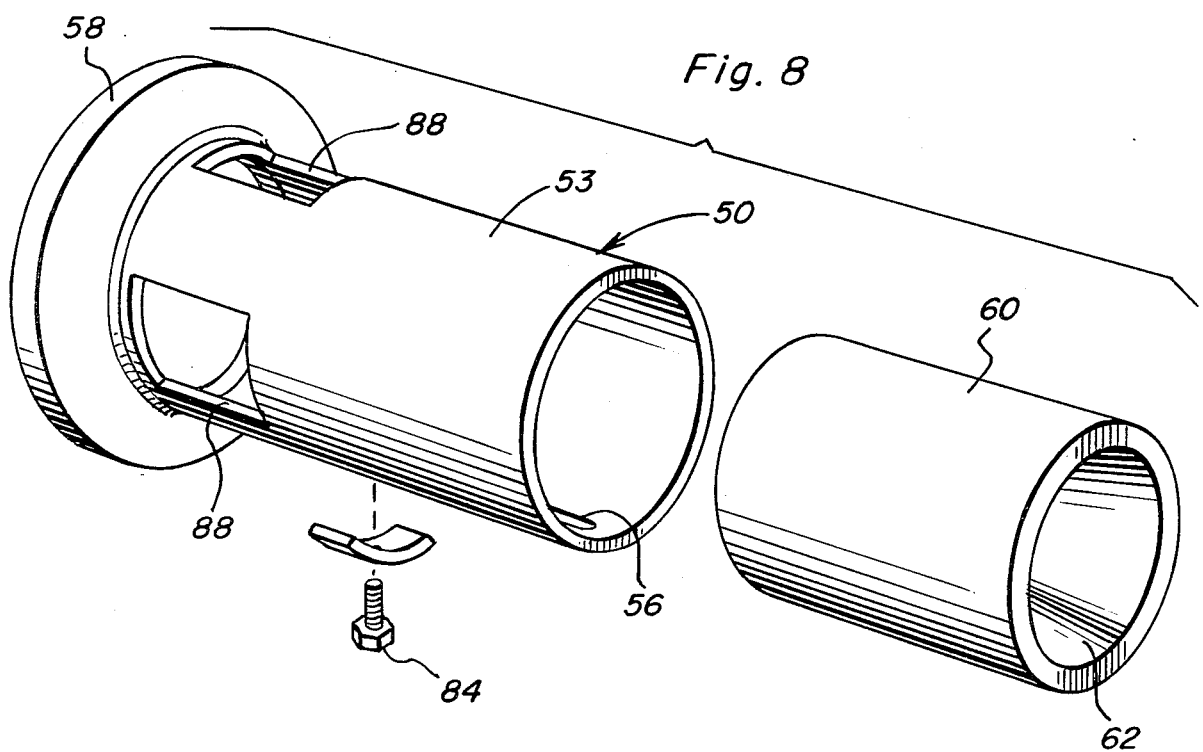
FIG. 8 is an exploded perspective view of the jig component illustrated in FIG. 3.

The jig assembly of the instant invention incorporates a first jig structure referred to in general by the reference numeral 16 and it may be seen from FIGS. 1, 5, and 7 of the drawings that the first jig structure 16 includes a pair of fabricated channel members 20 which are substantially semi-cylindrical in side elevation and substantially U-shaped in transverse cross section with each channel member 18 and 20 including a pair of laterally spaced apart semi-circular flanges 22 and 24 interconnected by an integral bight portion 26 extending between and connecting the larger radius of curvature arch edges thereof. The bight portions 26 each include radial slots 28 formed therein for the purpose to hereinafter be more fully set forth. The semi-circular channel members 18 and 20 are arranged in opposite relation opening toward each other pairs of longitudinally slotted connecting links 30 releasably join adjacent ends of the channel members 18 and 20. The connecting links each have their opposite ends pivotally connected to the corresponding channel member end by a pivot fastener 32 slidably received in the longitudinal slot. In this manner, the channel members 18 and 20 of the first jig structure 16 may be spaced apart sufficiently to be slipped over the mounting flange 12. After proper positioning relative to the mounting flange 12, the channel members 18 and 20 are shifted toward each other and the fasteners 32 may be tightened. In addition, each of the channel members 18 and 20 include the pair of longitudinally spaced rollers 34 journaled therefrom between the corresponding flanges 22 and 24 and which project through corresponding slots 28. The inner peripheral portions of the rollers 34 project inwardly of the inner extremities of the bight portion 26 and are therefore disposed for rolling engagement with the circular outer periphery of the mounting flange 12.

Also, it will be noted that the first jig structure 16 includes a stationary mounting flange 36 supported from the channel member 18 and that a mounting bracket 38 includes a clamp assembly 40 for clampingly supporting an acetylene cutting torch therefrom and further that the mounting bracket 38 is removably angularly adjustably supported from the mounting flange 36 by a clamp tight pivot fastener 42. Accordingly, the tip 44 of a cutting torch 46 may be clampingly supported from a clamp assembly 40 in proper position to efficiently cut the axle end 14 from the remainder of the axle 10 by actuation of the cutting torch 46 and the tip 44 and then slowly rotating the first jig structure 16 about the mounting flange 12. Of course, the rotatable mounting of the first jig structure 16 from the flange 12 enables the cut to be made by the cutting torch 46 to comprise a precision cut. Such a precision cut may be used in a manner subsequently to be hereinafter more fully set forth, or the cut may be finished to a more precision and plane cut by any suitable portable metal grinding apparatus.

After the axle end 14 has been cut from the axle 10, an adapter ring 48 is registered with the mounting flange 12 and thereafter the second jig structure of the instant invention and referred to by the reference numeral 50 is positioned relative to the adapter ring 48 and clamped in position through the utilization of a plurality of C-clamps 52. The second jig structure 50 includes a tubular body 53 having base and free ends 54 and 55 and a longitudinal slot 56 formed therein extending between the base and free ends. The base end 54 has a circular support flange 58 secured thereto and the support flange 58 is positionable within keyed stepped engagement with the outer surface of the adapter ring 48, the latter enjoying a similar keyed stepped engagement with the outer surface of the mounting flange 12. In this manner, the tubular body 53 may be supported from the axle 10 with the body 53 in coaxial relation with the axle 10.

A cylindrical body 60 is provided and is slidably receivable within the tubular body 53. The cylindrical body 60 includes reversely tapering internal conical surfaces 62 and 64 with which a pair of inner and outer roller bearing assemblies 66 and 68 are rollingly engaged. The roller bearing assemblies comprise conventional inner and outer bearing assemblies, minus the outer races thereof, such as those used on the original axle end 14 and the replacement stub axle end 70, see FIG. 6. The inner races 72 and 74 of the bearing assembly 66 and 68 are seated in the bearing race seat areas 76 and 78 provided on the replacement stub axle end and the replacement stub axle end is secured in position relative to the cylindrical body 60 through the utilization of the conventional wheel bearing nut 80 and washer 82. Thus, the replacement stub axle end 70 is journaled from the cylindrical body 60 in substantially the same manner in which the wheel to be mounted on the stub axle end 70 ultimately will be journaled thereon.

As hereinbefore set forth, the cylindrical body 60 fits snuggly into the tubular body 53 and a set screw or bolt 84 is provided and threadedly engaged in a radial threaded blind bore 86 formed in the cylindrical body 60 with the bolt slidably received in the slot 56.

Figure 6:
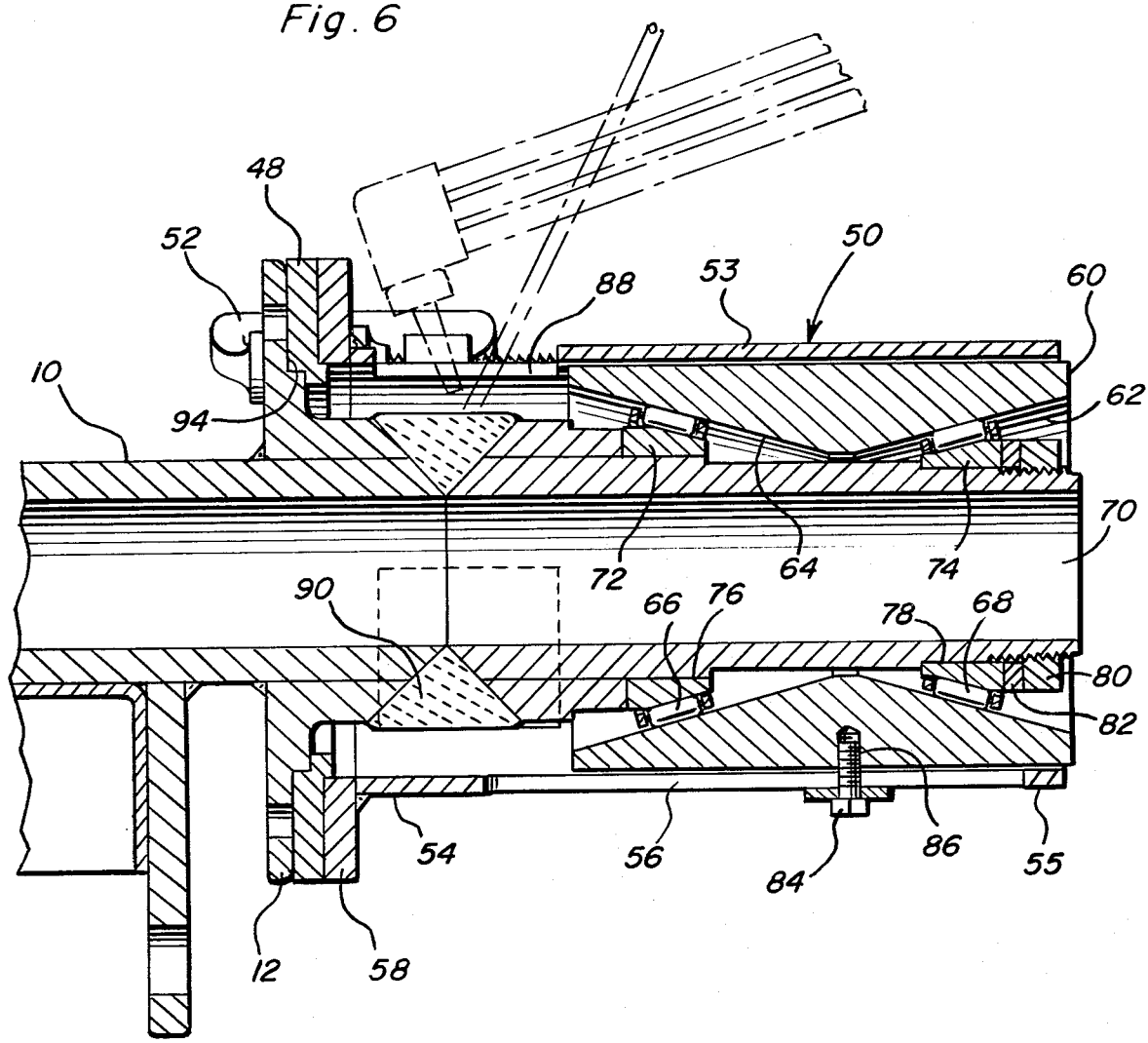
FIG. 6 is an enlarged fragmentary vertical sectional view taken substantially upon the plane indicated by the plane indicated by the section line 6—6 of FIG. 3.

After the second jig structure 50 has been positioned as illustrated in FIG. 6 of the drawings with the replacement stub axle end 70 journaled therefrom, tack welding may be performed through three circumferentially spaced windows 88 formed in the base end 54 of the tubular body 53 in order to tack weld the stub axle end 70 in proper coaxial position relative to the axle 10 from which the axle end 14 was previously removed. After the tack welding 90 has been performed through the windows 88 as illustrated in FIG. 3 of the drawings, the seat clamps 52 and the second jig structure 50 may be removed and the welding operation to secure the stub axle end 70 to the axle 10 may be completed as illustrated as at 92 in FIG. 4 of the drawings.

Figure 9:
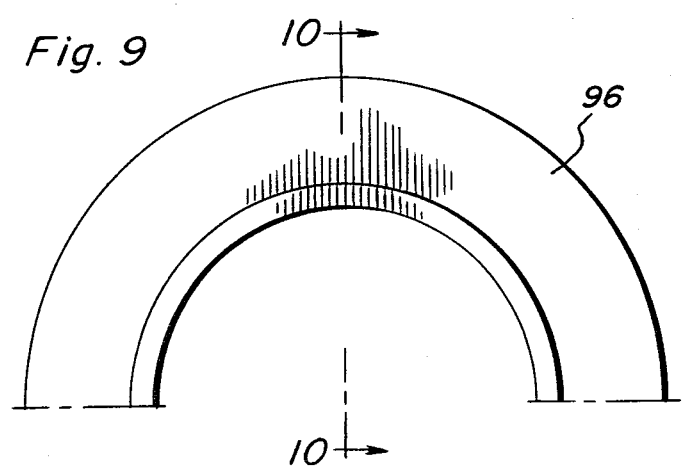
FIG. 9 is a fragmentary elevational view of a second form of adaptor ring to be used in conjunction with the jig component illustrated in FIGS. 3 and 6.
Figure 10:
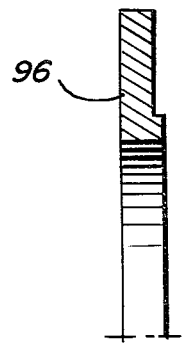
FIG. 10 is a vertical sectional view taken substantially upon the plane inidicated by the section line 10—10 of FIG. 9.

In some instances, the mounting flange will not include an outer relieved portion such as that illustrated in FIG. 6 of the drawings as at 94 will be slightly smaller in inside diameter. In such instances, the adapter ring 96 illustrated in FIGS. 9 and 10 may be used in conjunction with the flange 58 of the tubular body 53.

In any event, the adapter rings 49 and 90 key to the flange 12 in coaxial relation therewith and the tubular body 53 of the second jig structure 50 keys to either of the adapter rings 48 and 96 in coaxial relation therewith. Accordingly, the stub axle end 70 supported from the cylindrical body 60 will be precisely positioned in coaxial relation with the axle 10 when mounted as illustrated in FIG. 6 of the drawings prior to the tack welding being performed.

In renewing the axle end on the axle 10, the original axle end 14 is first removed in the manner illustrated in FIGS. 1 and 2 of the drawings. Thereafter, the new stub axle end 70 is secured to the axle 10 in the manner illustrated in the FIGS. 3 and 6 of the drawings and thereafter the welding is completed as illustrated as at 92 in FIG. 4. Accordingly, in order to renew the axle end 14, it is merely necessary to remove the brake assembly from the axle 10 and to thereafter install the jig structure 16 for cutting off the axle end 14. Thereafter, the jig structure 50 is installed and used to secure the new stub axle end 70 to the axle 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. The method of stubbing an axle end of the type including a brake backing plate mounting flange spaced inward of the axle end, said method including supporting a gas cutting torch tip from said backing plate mounting flange for movement through a circular path coaxial with said axle end and with said tip spaced slightly outwardly of and facing inwardly toward said axle end, moving the gas cutting torch through said circumferential path to cut said axle end leaving a cut end of the axle projecting from said brake backing plate supporting an axle stub end from said mounting flange in coaxial relation with said axle and adjusting said axle stub end along the center axis of said axle into position where the inner end of the axle stub end at least closely juxtaposed to the cut end of said axle, spot welding the interface between the cut axle end the inner end of said axle stub end at points spaced circumferentially about the juxtaposed ends and thereafter completing a full circumferential weld about said juxtaposed end.

2. A jig for stubbing an axle end including a brake backing plate mounting flange spaced inward of the axle end and wherein the axle has been cut to remove a damaged terminal end thereof along a circumferential path about the axle spaced slightly outwardly of the backing plate mounting flange, said jig including a tubular body having base and free ends with a support flange on its base end for abutting, registry with and support from said mounting flange with said tubular body loosely disposed about said cut end and the tubular body projecting outwardly beyond said cut end, and an axle end support structure axially adjustably mounted within said tubular body including an internal bearing surface defining means for journaling a replacement axle stub end.

3. The jig of claim 1 wherein said axle end support structure and said tubular body include means for releasably retaining said axle end support structure in an adjusted position relative to said tubular body.

4. The jig of claim 2 wherein said tubular body defines window openings formed therein at points spaced circumferentially thereabout closely adjacent said base end and in registry with said circumferential path.

5. The jig of claim 2 wherein said means for journaling a replacement axle stub end includes a sleeve snuggly slidable within said tubular member and including a pair of inside oppositely tapering conical surfaces spaced longitudinally thereof, said bearing surfaces having their small diameter ends disposed adjacent each other.

6. The combination of claim 5 wherein said axle end support structure and said tubular body include means for releasably retaining said axle end support structure in an adjusted position relative to said tubular body.

7. The jig of claim 6 wherein said means for releasably retaining said axle stub end support structure in an adjusted position includes a longitudinally extending radial slot formed in said tubular member and a generally radial clamp screw threadedly engaged in said sleeve and slidably received in said slot.

8. The jig of claim 7 wherein said tubular body defines window openings formed therein at points spaced circumferentially thereabout closely adjacent said base end and in registry with said circumferential path.

* * * * *